July 10, 1951 F. W. GAY 2,559,871
HOUSE STRUCTURE AND HEATING SYSTEM THEREFOR
Filed Aug. 24, 1949 3 Sheets-Sheet 1

INVENTOR.
Frazer W. Gay
BY George D. Richards
Attorney

July 10, 1951 F. W. GAY 2,559,871
HOUSE STRUCTURE AND HEATING SYSTEM THEREFOR
Filed Aug. 24, 1949 3 Sheets-Sheet 2

INVENTOR.
Frazer W. Gay,
BY George D. Richards
Attorney

Patented July 10, 1951

2,559,871

UNITED STATES PATENT OFFICE 2,559,871

HOUSE STRUCTURE AND HEATING SYSTEM THEREFOR

Frazer W. Gay, Metuchen, N. J.

Application August 24, 1949, Serial No. 112,090

7 Claims. (Cl. 237—1)

This invention relates to a novel house structure and heating system therefor, and, more particularly, to a house structure and heating system therefor which includes a heat pump of the reversed refrigeration cycle type such as shown in my co-pending patent application Ser. No. 112,089, filed August 24, 1949, wherein means is provided for extracting heat from the ambient air and storing said heat in the earth beneath the house, together with means for supplementing the stored heat by heat derived from solar radiation, and means to make the stored heat available to the heat pump evaporator during extreme cold weather.

It is an object of the instant invention to provide a house structure the surrounding walls of which are constructed to provide an envelope of recirculating air enclosing the house interior and including a passage extending contiguous to the earth beneath the house and around the below ground level part of the latter; the inside walls of this envelope being made of heat insulating material, and the outside walls of this envelope, which extend above frost line, being also made of heat insulating material but which include heat conductive walls bedded against the surrounding earth below frost line. A solar heat trap is provided in the south wall of the house, including damper means for including or excluding communication thereof with the air envelope, means being provided for circulating air through the envelope; all whereby the circulated air may be caused to traverse the solar heat trap during periods of solar radiation, so that heat derived from solar radiation may be taken up by the circulated air and transferred therefrom to the earth beneath the house, as said air traverses that portion of the envelope which extends contiguous to said underlying earth. Means is provided whereby heat stored in the earth may be conducted by the circulating air through the evaporator of the heat pump, so that the heat pump, in extreme cold weather, may receive the major supply of operating heat from the earth stored heat.

It is a further object of the invention to provide internal walls of the house structure with air flow passages in communication with the house interior, through which air heated by passage across the condenser of the heat pump may, in cold weather, be circulated through the house interior.

It is a further object of this invention to provide air duct means operative to deliver outdoor air across the evaporator of the heat pump and thence back out of doors; said ducts including adjustable damper means which can be disposed to exclude the passage of out door air during extremely cold weather while directing passage of air across the evaporator for transfer transfer thereto of heat from earth stored heat; the air envelope being so constructed and arranged that the air passes through the evaporator so as to give up heat thereto, the cool air being reheated as it again, in its recirculation, passes contiguous to the heat storing earth beneath the house.

Other objects of the instant invention, not at this time more particularly enumerated, will be understood from the following detailed description of the same.

An illustrative embodiment of the invention is schematically shown in the accompanying drawings, in which.

Similar characters of reference are employed in Figs. 1 to 4 inclusive to indicate corresponding parts.

Figure 1:
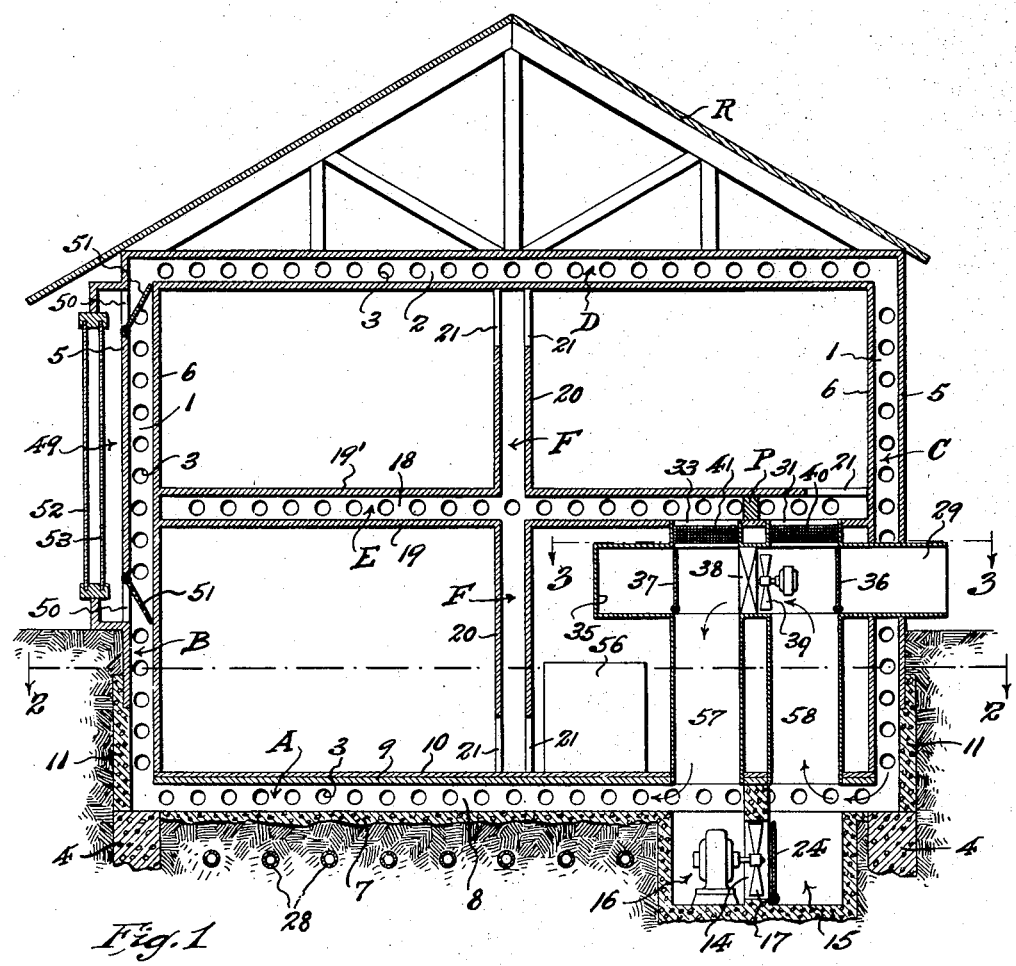
Fig. 1 is a transverse vertical section through a house structure according to this invention, taken on line 1—1 in Fig. 2.
Figure 3:
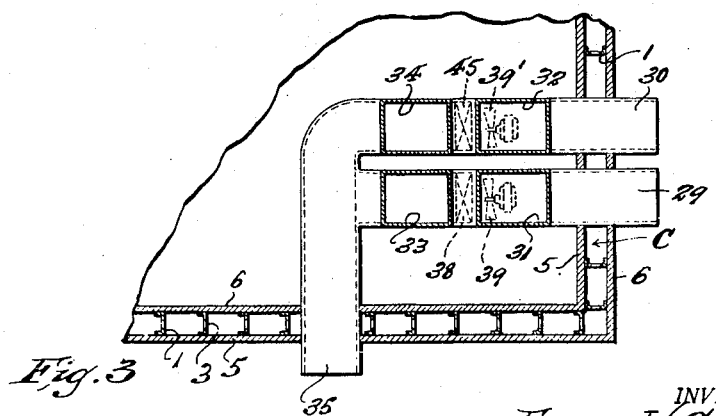
Fig. 3 is a fragmentary horizontal sectional view, taken on line 3—3 in Fig. 1.
Figure 2:
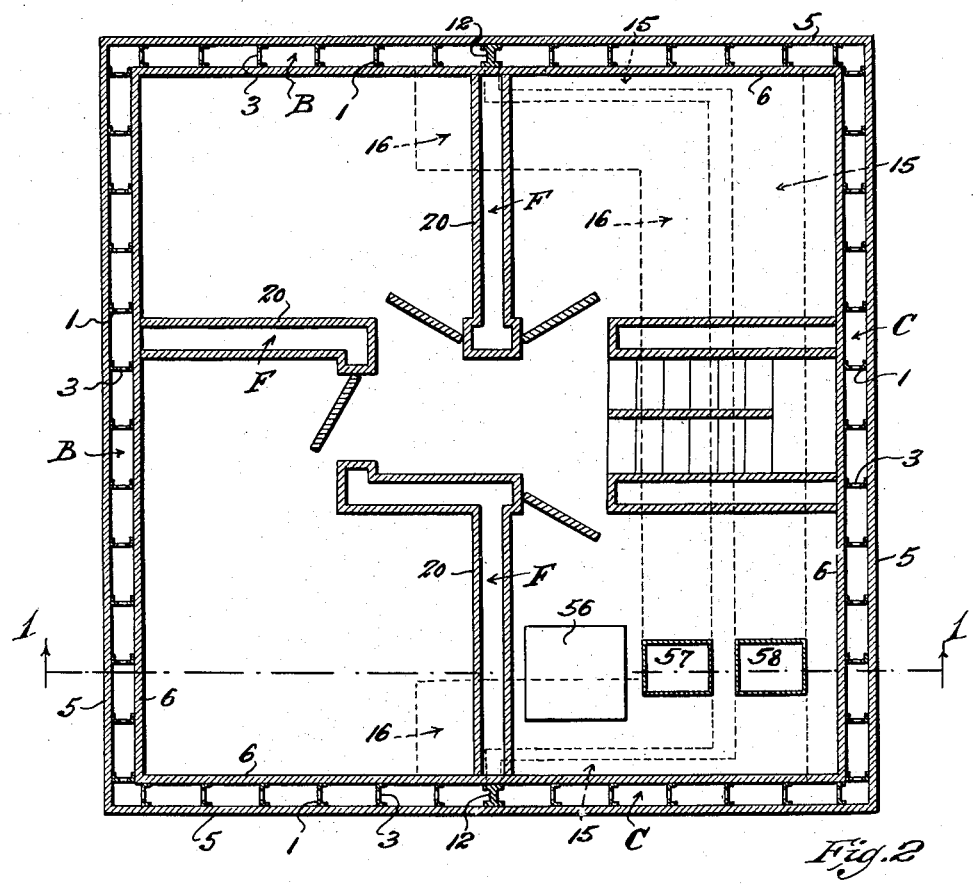
Fig. 2 is a horizontal section, taken on line 2—2 in Fig. 1.

Referring to the drawings, the reference character 1 indicates the studs of the exterior walls of the house building, and 2 the beams of the upper floor ceiling which support the building roof structure R. Said studs and beams are made of suitable metal in channel form, the webs of which are provided with openings 3 spaced along the length thereof. The studs 1 extend a substantial distance below the ground level of the building site, and are supported by footings 4 which are countersunk in the earth. The studs and beams 1—2 are faced at their outer sides by outer walls 5, and at their inner sides by inner walls 6; said walls being of heat insulating character, such e. g. as vermiculite plaster or similar material supported by metal lath (not shown) which is affixed to the studs and beams 1—2. The outer and inner walls 5 and 6 are spaced apart by the studs and beams 1—2, so as to provide intermediate passages which form an air circulation envelope by which the house interior is surrounded. The side walls of the house extend downwardly into the ground well below frost line, and, within the thus extended side walls, the earth is excavated to corresponding depth. The outer walls 5 penetrate the earth substantially to frost line depth, and terminate in heat conductive sections 11 of concrete which are contiguous to the surrounding earth below frost line. A concrete base-floor 7 of suitable thickness is laid upon the earth within the building interior, and extending over this base floor 7 are metallic sleepers 8 of channel or I-beam form, similar to the studs and beams 1 and 2, and also provided with openings 3 spaced therealong. Supported upon the beams 8 is a main floor 9, which is made of suitable insulating material, such as vermiculite concrete; the upper or exposed surface of the main floor 9 is overlaid with flooring 10 of material adapted to provide a desirable wearing surface. The intervening space between the base floor 7 and main floor 8 provides an air flow space A in communication with the air flow passages with which the side and top walls of the building are provided. The spaces between the studs 1, beams 2 and sleepers 8 intercommunicate through the openings 3 with which said studs, beams and sleepers are provided.

That part of the air circulating envelope which extends through the side wall structure is subdivided by imperforate studs or partitioning members 12, which respectively extend centrally of the building through the front and back sections of wall structure, thus providing an air flow section B in one half of the building for movement of air through the envelope in one direction, and an air flow section C in the other half of the building for movement of air through the envelope in opposite direction. These air flow sections B and C communicate with an air flow section D formed in the top wall, and through which air is conducted from one said section to the other.

Countersunk in the base floor 7 of the building, to extend between the front and back of the building, are ducts 15 and 16 which communicate with the earth contiguous air flow space A. The duct 15 communicates at its ends with the air flow section C, while the duct 16 communicates at its ends with the air flow section B. The air ducts 15 and 16 are connected for communication by an opening or port 14. A reversible motor driven air impelling fan 17 cooperates with the opening or port 14 to move the air from duct 15 to duct 16 or vice versa. The opening or port 14 can be opened and closed by a manipulable damper 24.

A solar heat trap 49 is provided in the south wall of the house, and is formed by spaced glass windows 52 and 53. The solar heat trap 49 communicates at its upper and lower ends with the air flow section B through ports 50. The ports 50 are adapted to be opened and closed as conditions may require, by manipulable dampers 51. During periods of sunshine these dampers 51 are opened, and the air impeller fan 17 is driven in direction to move air from duct 16 to duct 15, thence through air flow section C and air flow section D for descent through air flow section B, whence a considerable volume of the air flow is by-passed through the solar heat trap 49 to take up heat therefrom. The thus heated air is delivered to and passes through the earth contiguous air flow space A so as to transfer its solar derived heat to the underlying earth for storage therein, subject to use in extreme cold weather. When solar radiation is not available, dampers 51 and damper 24 are closed and fan 17 is stopped, thus removing the solar heat trap from the air flow circuit.

A conventional heat pump 56 is connected to its evaporator unit 38 and to its condenser 45 in manner to provide a reverse refrigeration cycle.

The evaporator unit 38 is mounted across a cold air duct 29 leading into the interior of the house from the outside ambient air. This cold air duct 29 terminates at its inner end in a discharge branch 35 which extends through the house wall back to the outside ambient air. A riser 58 extends from the air duct 15 to communicate with the cold air duct 29 adjacent the air intake side of the evaporator 38. A similar riser 57 leads from the cold air duct 29 adjacent to the air discharge side of the evaporator 38 for communication with the air duct 16. A damper 36 is manipulable to open the intake portion of the cold air duct 29 while closing the riser 58 and vice versa. Similarly, a damper 37 is manipulable to close the discharge branch 35 of the cold air duct 29 while opening communication between said cold air duct and the riser 57 and vice versa. An air impeller fan 39 is mounted within the cold air duct 29 adjacent the air intake side of the evaporator 38, the same being operative to move air through the latter.

The interior of the house is suitably subdivided to provide upper and lower room spaces by an intermediate floor structure comprising perforate beams 18 which support a lower storey ceiling 19 and an upper storey flooring 19', thus providing an intermediate air flow passage E. The upper and lower storeys are partitioned to provide suitable room spaces by hollow partition walls 20 the interiors of which provide air flow passages F which communicate with the air flow passage E. Air from the passages E and F is communicated to and from the rooms by way of openings or ports 21 with which the walls of the partitions 20 are provided.

Adjacent to the air intake side of the evaporator 38, the cold air duct 29 is provided with an air intake passage or port 31 which communicates with the air flow passage E on one side of a partition P which subdivides the same, and is further provided, adjacent to the air discharge side of the evaporator 38, with an air discharge passage or port 33 which likewise communicates with the air flow passage E on the opposite side of said partition P. Said passages or ports 31 and 33 are normally closed, in winter weather, by removable insulating blocks or partitions 40 and 41.

The condenser unit 45 is mounted across a second air intake duct 30 leading into the interior of the house from the outside ambient air, the inner end of said duct being connected with and for discharge through the discharge branch 35 to the outer atmosphere. Motor driven fan means 39' similar to the fan means 39 in duct 29, is mounted within the air intake duct 30 adjacent the air intake side of the condenser 45, whereby to move air across the latter, and dampers (not shown), similar to the dampers 36—37 in duct 29, are provided for opening and closing the duct 30 to and against admission of outdoor air. Adjacent to the air intake side of condenser 45, the cold air duct 30 is provided with an air intake passage or port 32 which communicates with the air flow passage E on one side of its partition P, and adjacent to the air discharge side of condenser 45, the cold air duct 30 is provided with an air discharge passage or port 34 which communicates with the air flow passage E on the opposite side of the dividing partition P. Said passages or ports 32 and 34 are normally closed by removable insulating blocks or partitions (not shown) similar to the blocks or partitions 40 and 41 which close corresponding passages or ports 31 and 33 of the cold air duct 29.

In the winter time, the dampers in cold air intake duct 30 are disposed to shut off admission of outdoor air, and the passages or ports 32 and 34 are opened so that air from the house interior may be circulated through passages E and F across the condenser 45, whereby cool air enters the passage or port 32, is driven across the condenser 45 so as to be warmed and then returned through passage or port 34, and by way of passages E and F to the house interior.

In extreme cold weather, the dampers 36 and 37 in the cold air intake duct 29 are positioned as shown in Fig. 1, whereby to shut off admission of cold outside air, and so as to receive air from riser 58 which is supplied from the air circulating envelope by way of air flow passage C and duct 15. The air thus moved is driven across the evaporator 38 and is cooled, thereafter passing down the riser 57 and thence through duct 16 to traverse the earth contiguous air flow space A where it takes up heat from the earth stored supply of heat so as to be warmed thereby, thence flowing by way of the air flow passages B and D back to air flow passage C for recirculation.

Figure 4:
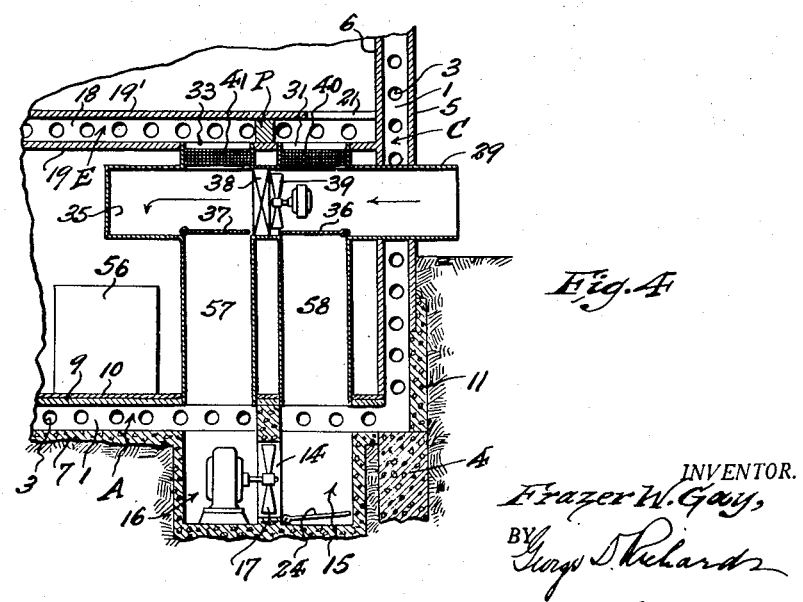
Fig. 4 is a fragmentary vertical sectional view, similar to that of Fig. 1, but showing another adjustment of the air circulating dampers controlling air movement across the evaporator of the heat pump means.

In moderately cold winter weather, the dampers 36 and 37 are set, as shown in Fig. 4, to close the risers 58 and 57, and to open the air intake duct 29 to flow of outdoor air across the evaporator 38, thus utilizing the heat of outdoor ambient air for evaporator operation, and conserving the earth stored heat.

Figure 5:
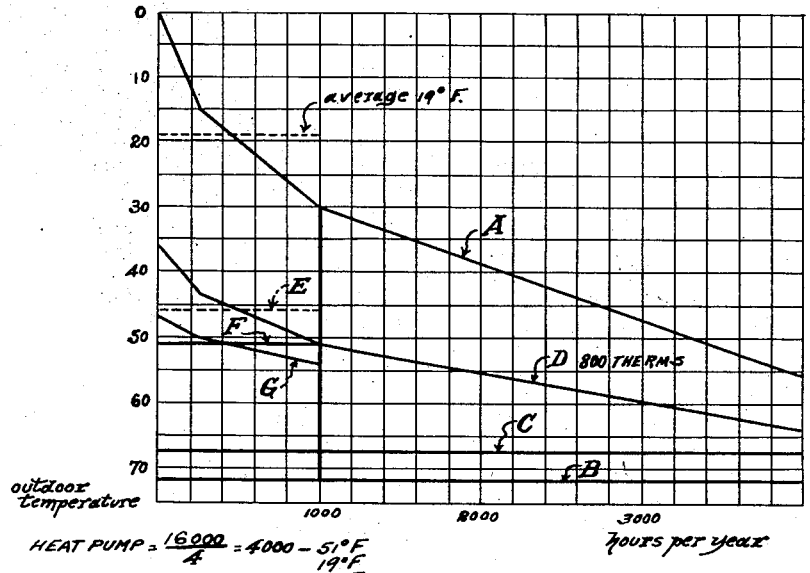
Figs. 5 and 6 are graphs illustrating performance results of the heating system according to this invention.
Figure 6:
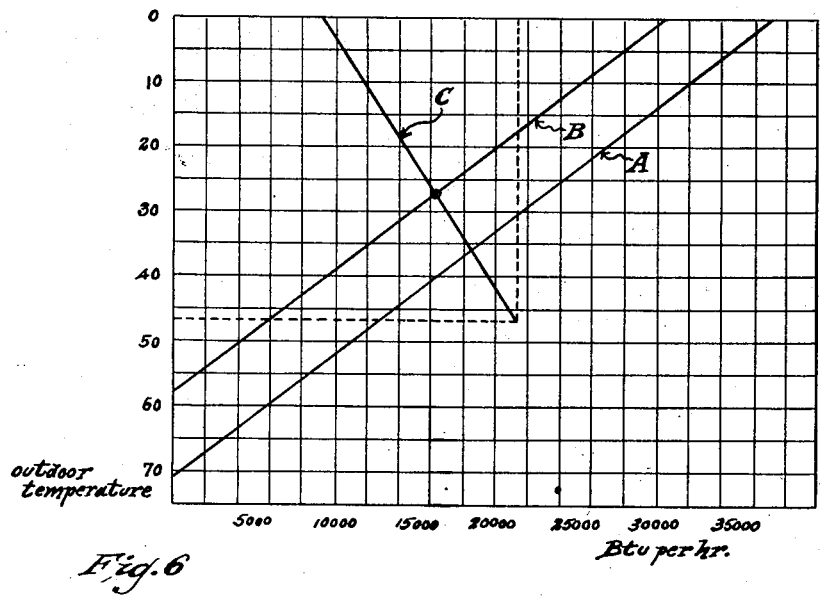

A line of piping 28 is buried in the earth a short distance beneath the base floor 7, said piping being looped back and forth in the earth, and so connected between the condenser 45 and heat pump 56 that the hot condensed refrigerant leaving the condenser first flows through the piping 28 before returned to evaporator 38. In a well designed system, about 15 per cent of the heat leaving the heat pump can be recovered from the hot refrigerant condensate and stored in the earth around the piping 28, whereby to make a large part of this stored heat available to the heat pump in very cold weather, and augments the supply of stored heat which is derived from solar energy through the agency of the solar heat trap. The operation and performance effects of the novel house heating system of this invention is indicated by the graphs of Figs. 5 and 6. In the graph of Fig. 5, curve A shows the assumed temperature degree F. against accumulated hours per year; that is for the coldest 250 hours (not consecutive) of the year when outdoor temperature varied from zero degree F. to 15° F. and for the next 750 hours (not consecutive) when the outdoor temperature varies from 15° F. to 30° F.

In the graph of Fig. 6, curve A is plotted to indicate the amount of heat consumed (B. t. u. per hour as abscissa) at any outdoor temperature (degrees F. as ordinate).

Curve A in the graph of Fig. 5 indicates that a heating rate of 500 B. t. u. per hour is required to raise the internal temperature of the house 1° F., or 1000 B. t. u. per hour, which passing through the inside wall 6 will cause a drop of 1° F. across that wall, and 1000 B. t. u. per hour passing through the outside wall 5 will cause a drop of 1° F. across the latter wall. It is assumed that living losses will be 5000 B. t. u. per hour, and that these losses will pass through both walls. Curve B, therefore, shows the net B. t. u. per hour that must be released within the house in order to maintain an interior temperature of 72° F. To heat the house, the heat pump should have a heat pumping capacity, at zero degree F. outdoor temperature, in B. t. u. per hour of one-quarter the 35,000 B. t. u. per hour required, i. e about 9000 B. t. u. per hour. Curve C indicates how the capacity of this heat pump will increase with a rise in air temperature. For example, at the coldest assumed temperature of the air in the envelope surrounding the house interior, the heat pump will be able to pump from its evaporator, when the envelope air is at a temperature of 46.5° F., approximately 21,700 B. t. u. per hour into the house interior. This 21,700 B. t. u. per hour plus the 5000 B. t. u. per hour living loss, or 26,700 B. t. u. per hour, will pass through the inner wall 6 of the envelope, thus producing a thermal drop of 26.7° F. This drop added to the 46.5° F., the envelope air temperature, will produce a maximum house interior temperature of 73.2° F. If the coefficient of performance is taken as 3.8 then the electric pumping energy (taken as heat) will amount to 21,700/3.8 or 5700 B. t. u. per hour. Of the 21,700 B. t. u. per hour delivered into the house interior, 5700 will pass out through the outer wall 5 of the envelope to the house exterior and 16,000 B. t. u. will return to the evaporator. In other words, the heat pump will recirculate 16,000 B. t. u. per hour, since 5700 B. t. u. per hour of electric energy will pump 16,000 B. t. u. per hour through the envelope inner wall 6 to be picked up by the evaporator and added to said 5700 B. t. u. per hour which is electrically produced, thus making up a total of 21,700 B. t. u. per hour pump output.

In the graph of Fig. 5 the curve D indicates the temperature of the air in the envelope between the walls 5 and 6 when the air is not in circulation and the solar heat trap is not contributing heat; i. e. the air in the envelope under such conditions would have a temperature about half-way between the indoor and the outdoor temperatures.

The graph of Fig. 5 further shows that for the 1000 coldest hours of the year the average outdoor temperature is 19° F., and curve E shows that the average temperature of the air in the envelope (without solar heat trap contribution or circulation) is about 45.5 degrees F.

In the operation of the system, enough heat derived from solar radiation and salvaged from hot refrigerant condensate is gained to raise the average of the air in the envelope to 51° F., this being indicated by curve F of the graph of Fig 5; and, furthermore, with the air in the envelope circulating in juxtaposition to the underlying earth, the variation of temperature (indicated by curve G of this graph) from the mean (curve F) will be only one-half that shown between curves D and E, and a minimum temperature will approximate 46.5° F.

In the graph of Fig. 6, the curve C indicates that the heat pump can and will pump all the heat required to heat the house interior directly from outdoors down to a temperature of 28.5° F. In the illustrative case it is assumed that outdoor air is passed across the evaporator 38 as a source of heat down to a temperature of 30° F., and that below this temperature earth stored heat and that of the envelope air is utilized as a source of heat delivered across the evaporator.

The average temperature drop across the inner wall of the air circulating envelope during the 1000 coldest hours of the year will be 72° F. less the average envelope air temperature of 51° F., i. e. 21° F., so that 21,000 B. t. u. per hour, on the average, will be required to pass through the inner wall 6 of the envelope. Of this 5000 B. t. u. will come from living losses and 16,000 B. t. u. from the heat pump. With a coefficient of performance of 4, 4000 B. t. u. will be converted from pump actuating electric current. This 4000 B. t. u. and the 5000 B. t. u., or 9000 B. t. u. per hour total, will pass through the outside wall 5 of the air envelope, thus producing a thermal drop of 9° F. However, the average drop across the outside wall 5 of the air envelope is 32° F. so that on the average 23,000 B. t. u. per hour will be required from earth stored heat or a total per year of 230 therms. About 800 therms per year will be required to heat the house interior, so that 230/800 or about 29 per cent of the total heat will be taken from earth stored heat, the balance less living losses being supplied by the heat pump pumping heat from outdoor air.

Since changes could be made in the described building structure and heating system therefor, and different embodiments thereof could be made without departing from the scope of the here following claims, it is therefore intended that the matter contained in the foregoing description and shown in the accompanying drawings shall be interpreted as illustrative and not in a limiting sense.

I claim:

1. In a house structure and heating system therefor, said house structure comprising side and top wall structures formed by spaced outer and inner walls of heat insulating character, the space between said outer and inner walls providing, in part, an air circulating envelope surrounding the house interior, a ground floor structure comprising a base floor of heat conductive character contiguous to the underlying earth and an interior flooring of heat insulating character spaced above said base floor so as to complete the air circulating envelope around the house interior, the earth mass beneath said ground floor structure being adapted to serve as a heat storage body, a heat pump for heating the house interior, a refrigerant fluid evaporator for said heat pump, means to deliver at will heat from the house exterior across the evaporator, means adapted to be operated in extreme cold weather for delivering heat from the heat storage body across said evaporator, a refrigerant fluid condenser for said heat pump, means to deliver air from the house exterior across said condenser, and piping imbedded in the heat storage body through which hot condensate from the condenser passes in circulation back to the evaporator, whereby heat from said condensate is transferred to the heat storage body to supplement the heat stored therein.

2. In a house structure and heating system therefor, said house structure comprising side and top wall structures formed by spaced outer and inner walls of heat insulating character, the space between said outer and inner walls providing, in part, an air circulating envelope surrounding the house interior, a ground floor structure comprising a base floor of heat conductive character contiguous to the underlying earth and an interior flooring of heat insulating character spaced above said base floor so as to complete the air circulating envelope around the house interior, the earth mass beneath said ground floor structure being adapted to serve as a heat storage body, a heat pump for heating the house interior, a refrigerant fluid evaporator for said heat pump, means to deliver at will heat from the house exterior across the evaporator, means adapted to be operated in extreme cold weather for delivering heat from the heat storage body across said evaporator, a solar heat trap to supply heat derived from solar radiation to the air in said air circulating envelope, and means for circulating at will air flow in said envelope through said solar heat trap and thence through the ground floor portion of the envelope for transfer of solar produced heat to the heat storage body and for transfer of stored heat from the heat storage body across the evaporator.

3. In a house structure and heating system therefor, said house structure comprising side and top wall structures formed by spaced outer and inner walls of heat insulating character, the space between said outer and inner walls providing, in part, an air circulating envelope surrounding the house interior, a ground floor structure comprising a base floor of heat conductive character contiguous to the underlying earth and an interior flooring of heat insulating character spaced above said base floor so as to complete the air circulating envelope around the house interior, the earth mass beneath said ground floor structure being adapted to serve as a heat storage body, a heat pump for heating the house interior, a refrigerant fluid evaporator for said heat pump, means to deliver at will heat from the house exterior across the evaporator, means adapted to be operated in extreme cold weather for delivering heat from the heat storage body across said evaporator, a solar heat trap to supply heat derived from solar radiation to the air in said air circulating envelope, means for circulating at will air flow in said envelope through said solar heat trap and thence through the ground floor portion of the envelope for transfer of solar produced heat to the heat storage body and for transfer of stored heat from the heat storage body across the evaporator, a refrigerant fluid condenser for said heat pump, means to deliver air from the house exterior across the condenser, and piping imbedded in the heat storage body through which hot condensate from the condenser passes in circulation back to the evaporator, whereby heat from said condensate is transferred to the heat storage body to supplement the heat stored therein.

4. In a house structure and heating system therefor, said house structure comprising side and top wall structures formed by spaced outer and inner walls of heat insulating character, the space between said outer and inner walls providing, in part, an air circulating envelope surrounding the house interior, means dividing the air circulating envelope portion within the side wall structure so as to form a rising air flow course in one part of the side wall structure ascending to the air circulating envelope portion within the top wall structure and a descending air flow course in another part of the side wall structure descending from the latter, a ground floor structure comprising a base floor of heat conductive character contiguous to the underlying earth and an interior flooring of heat insulating character spaced above said base floor so as to complete the air circulating envelope between said rising and descending air flow courses thereof, reversible means to circulate air in selected direction from the ground floor portion of the envelope through side and top wall portions thereof back to said ground floor portion, the earth mass beneath said ground floor portion of the envelope being adapted to serve as a heat storage body, a heat pump for heating the house interior, a refrigerant fluid evaporator for said heat pump, means for delivering outdoor air across the evaporator and back out of doors, a driven fan for moving air across the evaporator, a solar heat trap mounted in and exposed at the south wall of the house and adapted to be connected in communication with said air envelope, a second driven fan for moving air through said solar heat trap and air envelope, damper means for controlling movement of air through said solar heat trap, air delivery and return ducts interconnecting between said air envelope and said outdoor air delivery means respectively on opposite sides of the evaporator, whereby to deliver stored heat transmitting air across the evaporator, and additional damper means operative in certain positions to open the outdoor air delivery means and close said delivery and return ducts and in other positions to open the latter and close the former.

5. In a house structure and heating system therefor, said house structure comprising side and top wall structures formed by spaced outer and inner walls of heat insulating character, the space between said outer and inner walls providing, in part, an air circulating envelope surrounding the house interior, means dividing the air circulating envelope portion within the side wall structure so as to form a rising air flow course in one part of the side wall structure ascending to the air circulating envelope portion within the top wall structure and a descending air flow course in another part of the side wall structure descending from the latter, a ground floor structure comprising a base floor of heat conductive character contiguous to the underlying earth and an interior flooring of heat insulating character spaced above said base floor so as to complete the air circulating envelope between said rising and descending air flow courses thereof, reversible means to circulate air in selected direction from the ground floor portion of the envelope through side and top wall portions thereof back to said ground floor portion, the earth mass beneath said ground floor portion of the envelope being adapted to serve as a heat storage body, a heat pump for heating the house interior, a refrigerant fluid evaporator for said heat pump, means for delivering outdoor air across the evaporator and back out of doors, a driven fan for moving air across the evaporator, a solar heat trap mounted in and exposed at the south wall of the house and adapted to be connected in communication with said air envelope, a second driven fan for moving air through said solar heat trap and air envelope, damper means for controlling movement of air through said solar heat trap, air delivery and return ducts interconnecting between said air envelope and said outdoor air delivery means respectively on opposite sides of the evaporator, whereby to deliver stored heat transmitting air across the evaporator, additional damper means operative in certain positions to open the outdoor air delivery means and close said delivery and return ducts and in other positions to open the latter and close the former, a refrigerant fluid condenser for said heat pump, means including a driven fan for delivering outdoor air across said condenser and back out of doors, and piping imbedded in the heat storage body through which hot condensate from the condenser passes in circulation back to the evaporator, whereby heat from the condensate is transferred to the heat storage body to supplement heat stored therein.

6. In a house structure and heating system therefor as defined in claim 4, wherein the house structure includes hollow intermediate floor and room dividing partition structures having intercommunicating internal air flow passages provided with openings communicating with the house interior, and wherein the means for delivering outdoor air across the evaporator includes air admission and discharge passages communicating with the house interior through said internal air flow passages and openings from opposite sides of the evaporator, and means to close said air admission and discharge passages in cold winter weather and to open the same in hot or summer weather when the outdoor air delivery means is closed against air admission.

7. In a house structure and heating system therefor as defined in claim 5, wherein the house structure includes hollow intermediate floor and room dividing partition structures having intercommunicating internal air flow passages provided with openings communicating with the house interior, and wherein the means for delivering outdoor air across the evaporator includes air admission and discharge passages communicating with the house interior through said internal air flow passages and openings from opposite sides of the evaporator, means to close said air admission and discharge passages in cold winter weather and to open the same in hot or summer weather when the outdoor air delivery means is closed against air admission, and wherein the means for delivering air across the condenser also includes air admission and discharge passages communicating with the house interior through said internal air flow passages and openings from opposite sides of the condenser, and means to close said last mentioned air admission and discharge passages when the means for delivering outdoor air across the condenser is open and vice versa.

FRAZER W. GAY.

REFERENCES CITED

The following references are of record in the file of this patent:

UNITED STATES PATENTS

| Number | Name | Date |
|---|---|---|
| 2,376,859 | Benn | May 29, 1945 |

FOREIGN PATENTS

| Number | Country | Date |
|---|---|---|
| 875,411 | France | Sept. 21, 1942 |
| 875,412 | France | Sept. 21, 1942 |